Sept. 19, 1950     A. R. VOGEL     2,522,694
STEERING SYSTEM

Filed April 19, 1947     2 Sheets-Sheet 1

INVENTOR.
Alvin R. Vogel
BY
ATTORNEY

Sept. 19, 1950 A. R. VOGEL 2,522,694
STEERING SYSTEM
Filed April 19, 1947 2 Sheets-Sheet 2

INVENTOR.
Alvin R. Vogel
BY
ATTORNEY

Patented Sept. 19, 1950

2,522,694

UNITED STATES PATENT OFFICE 2,522,694

STEERING SYSTEM

Alvin R. Vogel, Los Angeles, Calif.

Application April 19, 1947, Serial No. 742,507

10 Claims. (Cl. 74—498)

This invention relates to a steering mechanism and more particularly to a dual steering mechanism for heavy vehicles such as trucks and busses.

The conventional steering mechanisms provided on certain classes of vehicles, such as trucks and busses, is unsatisfactory under certain conditions of operation, such as turning the wheels of a vehicle when stationary and the guiding of a vehicle when backing into alleys and up to loading platforms. Under these conditions, much physical effort is required of the operator and renders the operation of such a vehicle laborious and tiresome. Also, large vehicles equipped with large tires require much physical effort to steer at low speeds and in turning sharp corners.

The conventional steering mechanism provides the proper leverage between the steering wheel and the wheels to be guided under most conditions of operation, such as when the vehicle is in forward motion and it is advisable to retain a steering wheel that will provide the usual leverage for which the vehicle was designed. Moreover, the steering wheel should be free from knobs or accessories which might interfere with the normal use of the steering wheel. In the event an auxiliary steering mechanism is used, it is important that it can be instantaneously engaged or disengaged with the usual steering wheel and post in order that the vehicle may be under control of the operator at all times. Therefore, it is a primary object of this invention to provide a steering mechanism, including a single steering wheel, which may be instantaneously disconnected and connected to the steering posts to provide different leverages.

Another object is to provide a dual steering mechanism that may be connected to a steering post by differential mechanism, which mechanism may be caused to normally connect the steering wheel directly with the steering post.

Another object is to provide a dual steering assembly which may be readily and easily substituted for the conventional steering wheel of a vehicle to provide different leverages for turning the steering post and novel means for instantaneously changing the leverage between the steering wheel and steering post at the will of an operator.

A further object is to provide a steering system having the above characteristics that shall be attractive in appearance, durable and efficient in operation.

The above and other objects will be made apparent throughout the further description of the invention when taken in connection with the accompanying drawings wherein like reference characteristics refer to like parts. It is to be distinctly understood that the drawings are not a definition of the invention but merely illustrate one form by means of which the invention may be effectuated. In the drawings.

Figure 1:
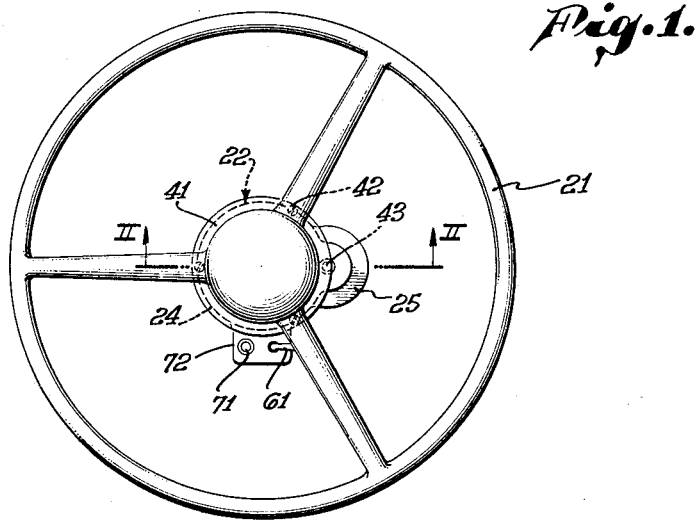
Fig. 1 is a top plan view of the steering mechanism embodying the invention.
Figure 4:
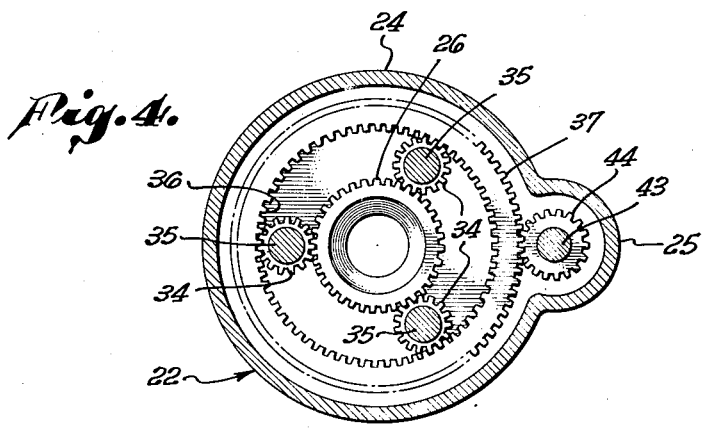
Fig. 4 is a sectional view taken along the line IV—IV of Fig. 2.

Referring to the drawings, in the exemplary form shown 10 designates the upper end portion of a stationary tubular housing surrounding a conventional steering post 11. The steering post or shaft 11 is positioned and turnably supported in the stationary housing 10 by a suitable bearing, one of which is shown at 12. The upper end of the steering post 11 is reduced at 13, the end of which is externally threaded, as shown at 14, for receiving a washer 15 and locking nut 16. The reduced portion 13 forms a shoulder 17 on which the bottom end of the hub of an external gear 18 rests. Intermediate the shoulder 17 and the threaded portion 14 there is provided a longitudinally splined portion 19, the splines engaging with cooperating splines in the hub of the gear 18, as clearly seen by the drawings. The tubular housing 10, shaft 11, splines 19 and threaded nut 16 represent the conventional steering mechanism having the steering wheel 21 removed.

An enlarged housing extension represented in its entirety by 22 is mounted on the upper end of the tubular housing 10. The extension 22 is provided with a reduced tubular portion 23 adapted to receive the upper end of the tubular housing 10 and is rigidly fixed thereto by any suitable means such as welding. The extension 22 includes an upper portion 24, which is radially enlarged as compared to the housing 10 and is circular in shape except for a protrusion 25, the protrusion 25 extending downwardly for substantially the same distance as the tubular portion 23. The lower end of the protrusion 25 is open for the purpose of receiving a magnetic mechanism later to be described.

Figure 5:
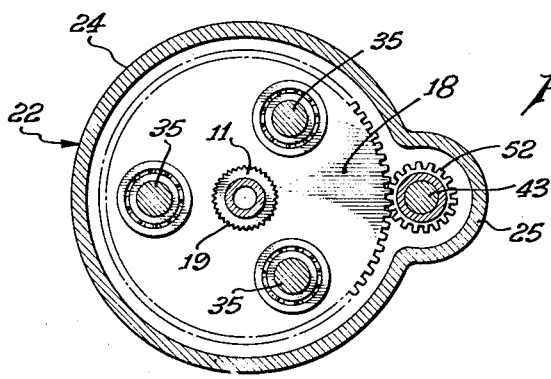
Fig. 5 is a sectional view taken along the line V—V of Fig. 2.

For the purpose of providing a differential between the steering wheel 21 and the shaft 11, there is provided a sun gear 26 having an integral upstanding shaft 27 reduced at 28 and externally threaded at 29 to receive a locking nut 31. Adjacent the upper end of the shaft 27 and on the reduced portion 28 are provided longitudinal splines 32 for engaging cooperating splines provided in the hub 33 of the steering wheel 21. The steering wheel 21 may be the conventional wheel provided with the vehicle or the wheel may be modified to suit a particular construction. The sun gear 26 meshes with three planetary gears 34 journaled on vertical shafts 35, carried by the body of the external gear 18 as clearly shown in Fig. 5. The planetary gears 34 mesh with an internal gear 36 provided in the ring gear 37. The ring gear is provided with an external gear portion 37 and is rotatably supported in bearings 38. The bearings 38 may be dual constructed with bearing 39, the latter mounted within a central opening in a top 41 of the extension 24, the top 41 being rigidly fixed to the upper end of the extension 24 by means of screws 42.

For the purpose of locking gear 18 and gear 37 together and causing the gear assembly to turn in unison there is provided a shaft 43 having a pinion 44 adjacent its upper end. The pinion 44 may be either integral with the shaft 43 or keyed thereto. The upper end of the shaft 43 is journaled in a bearing 45 carried in an opening 46 provided in the upper flanged end of the extension 24. The lower end of this shaft is provided with longitudinal splines 47, the latter adapted to slidably engage corresponding splines provided in a bore 48 in the upper end of an armature 49 of a conventional magnetic coil 51. Below the pinion 44 there is provided a like pinion 52, turnably supported on the shaft 43 by means of a bearing 53. Extending downwardly from the pinion 43 is an integral tubular portion 54 terminating in an annular flange 55.

On the lower face of the flange 55 is provided a plurality of downwardly extending, radially disposed projections 56. These projections normally engage corresponding openings or slots 57 provided about the periphery of the flanged head 58 of the armature 49. As long as the projections 56 on the flange 55 carried by the pinion 52 are in engagement with the slots 57 in the flanged head 58 of the armature 49, the pinions 52 and 44 will be held in fixed relation by way of the splines 47 on the shaft 43 of the pinion 44. Therefore, the two pinions will be caused to rotate in unison and prevented from relative movement one with the other.

Upon imparting motion to the steering wheel 21 the entire planetary gear assembly will be caused to rotate in unison and as the gear 18 is splined to the shaft 11 the steering wheel 21 will turn the shaft 11 directly with the ratio of 1 to 1. When the operator desires a differential or additional leverage between the steering wheel 21 and shaft 11 he energizes the magnetic coil 51 by means of a switch 61 conveniently placed on the top of the extension 24. Upon energizing the coil 51, the armature 49 will be instantly moved downwardly against a spring 50 and bottom on the seat 62, during which movement the slots 57 in the armature head 58 will be brought downwardly and into contact with corresponding projections 64 extending upwardly from a brake member 65.

The brake member 65 is rigidly fixed in a recess 66 provided interiorly of the lower portion of the protrusion 24 and keyed thereto by means of a key 67 and snap ring 68. Inasmuch as the shaft 43 is splined to the armature 49, the shaft 43 will be held against rotation and the freeing of the flange 55 carried by the pinion 52 leaves the pinion 52 free to rotate. In this position the turning of the wheel 21 will impart motion to the shaft 11 by way of the sun gear 26, planetary gears 34 meshing with the now stationary internal gear 36, the latter being held stationary by the pinion 44, and inasmuch as the planetary gears 34 are carried by the gear 18, the gear 18 will be caused to rotate, rotating the shaft 11 by way of the splines 19. The ratio between the wheel 21 and shaft 11 may be predetermined by selecting the sizes of gears 18 and 37, sun gears 26, planetary gears 34 and sun gear 26. In the illustration shown the ratio between the wheel and shaft is 2.8 to 1, which will give the operator the mechanical advantage of the differential between the steering wheel 21 and post 11, thereby rendering the turning of the wheel 21 less laborious. Upon deenergizing the coil 51, the spring 50 will spring the flange 58 upwardly and engage the recesses 57 with projections 56 in the flange 55 and lock the pinion to turn the differential assembly in unison and provide a ratio of 1 to 1 between the wheel and shaft as above described.

As a precaution, a light 71 is provided in the casing 72 of the switch 61 for indicating to the operator when the coil 51 is energized. The wiring diagram for connecting the coil and light to the battery is of such a simple nature that it is not thought to need any illustration or description for the purpose of this disclosure.

Figures 2, 3:
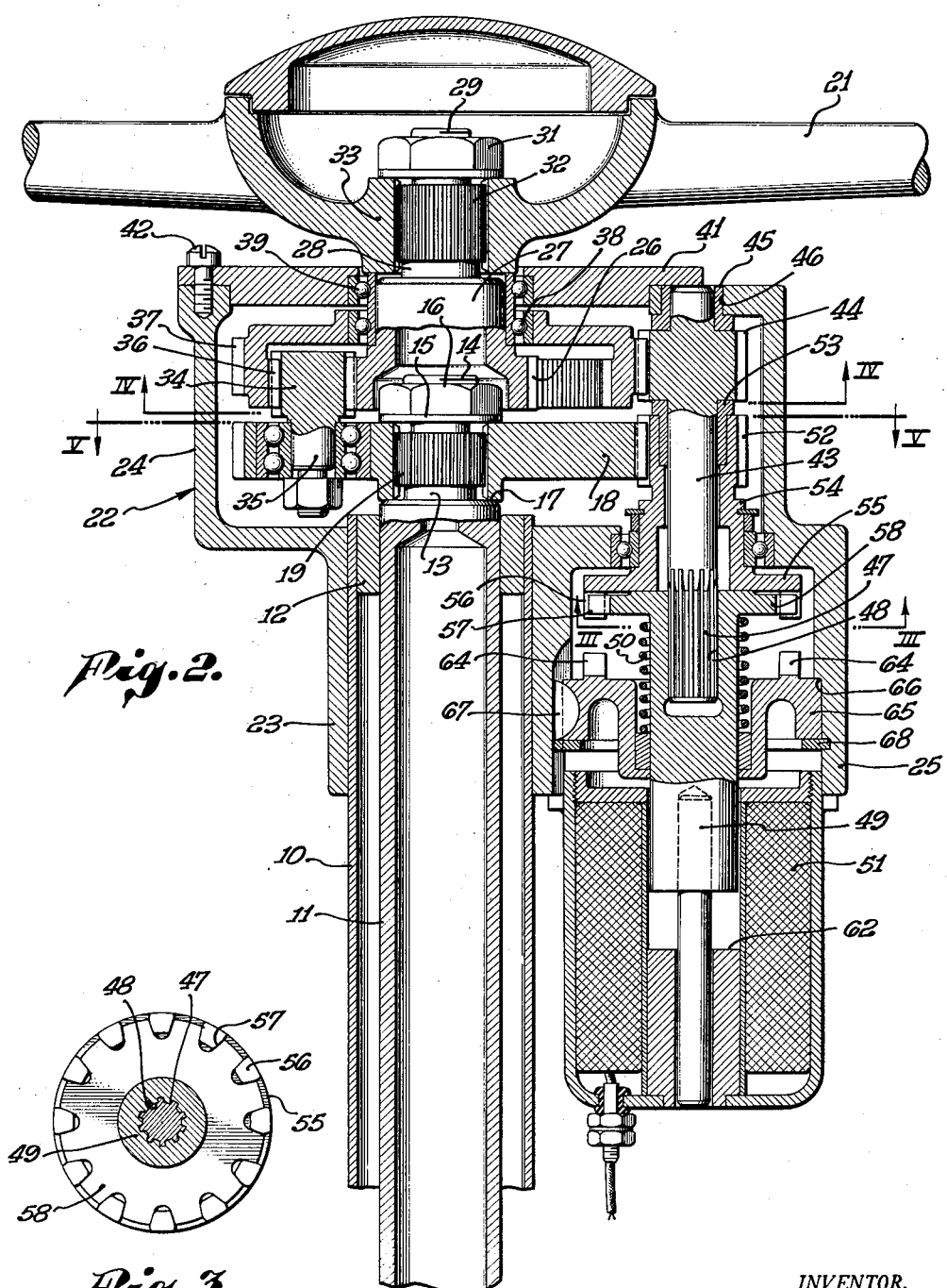
Fig. 2 is a sectional view taken along the line II—II of Fig. 1.
Fig. 3 is a sectional view taken along the line III—III of Fig. 2.

In the operation of the device, the coil 51 is normally deenergized and the armature 49 is held by spring 50 in the position shown in Fig. 2 of the drawings. In this position, the two pinions 52 and 44 are locked in unison, and the steering gear may be operated to turn the posts 11 in the direct conventional manner. When additional leverage is required between the steering wheel 21 and post 11, the operator energizes the coil 51 to lock the shaft 43 of the pinion 44 with the brake 65, thereby locking the gear 37 with the locked pinion 44 so that the post 11 may be rotated by way of the differential provided by the sun gear and planetary gears.

The present invention is comparatively simple and inexpensive to manufacture. The device may be readily installed on a conventional steering post by removing the conventional steering wheel and the steering wheel removed may be reinstalled on the shaft 28 of the sun gear 26. By the use of the magnetic coil 51, and spring 50, the gear ratios are changed instantaneously and positively, whereby the steering mechanism is under the control of the operator at all times.

While only an exemplary form has been illustrated and described, it will now be apparent to those skilled in the art that certain changes, substitutions, additions and omissions may be made in the form shown without departing from the spirit and scope of the appended claims.

I claim:

1. A steering gear including a steering wheel, a steering post, planetary gearing means for connecting said wheel to said post, and means for rendering said gearing means ineffective, whereby to prevent relative movement between said wheel and said post, said planetary gearing means including a pair of aligned, external gears, one gear of said pair of gears supporting planetary gears, the other gear of said pair of gears having internal teeth meshing with said planetary gears, said means for rendering said planetary gearing means ineffective, including an auxiliary shaft parallel with said post, said shaft having a pinion fixed relative thereto and meshing with one of said external gears, another pinion on said shaft mounted for rotation thereon, the last said pinion meshing with the external gear supporting said planetary gears.

2. A steering gear in accordance with claim 1, wherein means is provided cooperable with said auxiliary shaft for selectively effecting different gear ratios between said wheel and said post.

3. A steering gear in accordance with claim 1, wherein means is provided cooperable with said auxiliary shaft for locking said auxiliary shaft against rotation and preventing relative movement between said fixed pinion and one of said external gears.

4. A steering gear including a steering wheel, a steering post, a sun gear carried by said wheel, an external gear carried by said post, planetary gears carried by said external gear and meshing with said sun gear, a ring gear having both external and internal teeth rotatably supported relative to said wheel, the said planetary gears meshing with the said internal teeth, and means cooperable with said external gear and said ring gear for effecting different ratios between said wheel and said post.

5. A steering gear in accordance with claim 4, wherein the last said means includes an auxiliary shaft positioned parallel to said post, a pinion fixed to said shaft, said pinion meshing with said ring gear and electrical means for locking said pinion and said ring gear against relative movement.

6. A steering system including a steering wheel, a stub shaft carried thereby having a sun gear thereon, a ring gear having external and internal teeth rotatably supported on said stub shaft, a steering post, an external gear carried thereby, planetary gears supported by the last said external gears, said planetary gears meshing with said internal teeth and means for effecting different ratios between said wheel and said post, the said means including electrical means for preventing rotation of the said ring gear having internal teeth.

7. A steering system including a steering post, a housing therefor, a steering wheel, planetary gearing means for connecting said wheel with said post, a housing for said gearing means fixed rigid with the first said housing, an auxiliary shaft journaled within said last housing having spaced, axially aligned pinions thereon, the said gearing means including axially aligned external gears, the said pinions meshing with said external gears and electrical means for locking one of said pinions against relative movement with its associated external gear.

8. A steering system including a steering wheel, a steering post, planetary gear means for connecting said wheel to said post, and means for rendering said planetary gearing means ineffective for preventing relative movement between said wheel and said post, each of said means including a pair of aligned external gears, said planetary gearing means including a driving shaft and a driven shaft in axial alignment, said means for rendering said planetary gearing means ineffective including an auxiliary shaft parallel to said aligned shafts, said pairs of external gears being in operative meshed relationship, and means cooperable with said auxiliary shaft while said external gears are in meshed relationship for effecting different ratios between said driving shaft and said driven shaft.

9. A steering system including a steering wheel, a steering post, planetary gear means for connecting said wheel to said post, and means for rendering said planetary gearing means ineffective for preventing relative movement between said wheel and said post, each of said means including a pair of aligned external gears, said planetary gearing means including a driving shaft and a driven shaft in axial alignment, said means for rendering said planetary gearing means ineffective including an auxiliary shaft parallel to said aligned shafts, said pairs of external gears being in operative meshed relationship, and means cooperable with said auxiliary shaft while said external gears are in meshed relationship for effecting different ratios between said driving shaft and said driven shaft, the last said means including electrically actuated means.

10. A steering system, including a steering wheel, a steering post, planetary gearing means for effecting different ratios between said wheel and said post, said gearing means including aligned external gears, an auxiliary shaft provided with axially aligned pinion gears each in operative meshed relationship with a respective external gear, and electrically actuated means cooperable with said auxiliary shaft for selecting said ratios while the gears are in operatively meshed relationship.

ALVIN R. VOGEL.

REFERENCES CITED

The following references are of record in the file of this patent:

UNITED STATES PATENTS

| Number | Name | Date |
|---|---|---|
| 1,316,248 | Latham | Sept. 16, 1919 |
| 1,425,678 | Newhouse | Aug. 15, 1922 |
| 1,792,484 | Fawick | Feb. 17, 1931 |
| 2,156,698 | Martin | May 2, 1939 |
| 2,174,672 | Von Soden-Fraunhofen | Oct. 3, 1939 |
| 2,317,029 | Claytor | Apr. 20, 1943 |
| 2,339,473 | Griswold et al. | Jan. 18, 1944 |

FOREIGN PATENTS

| Number | Country | Date |
|---|---|---|
| 448,428 | Great Britain | June 8, 1936 |